Aug. 5, 1969   F. J. RUSSELL ET AL   3,459,448
LOW-FRICTION INSERT FOR LATCH BOLT RETRACTOR
Filed April 14, 1967   2 Sheets-Sheet 1

INVENTORS
FRED J. RUSSELL
RICHARD L. ARMSTRONG
VERNARD W. SANDERS
BY Beehler & Arant
ATTORNEYS

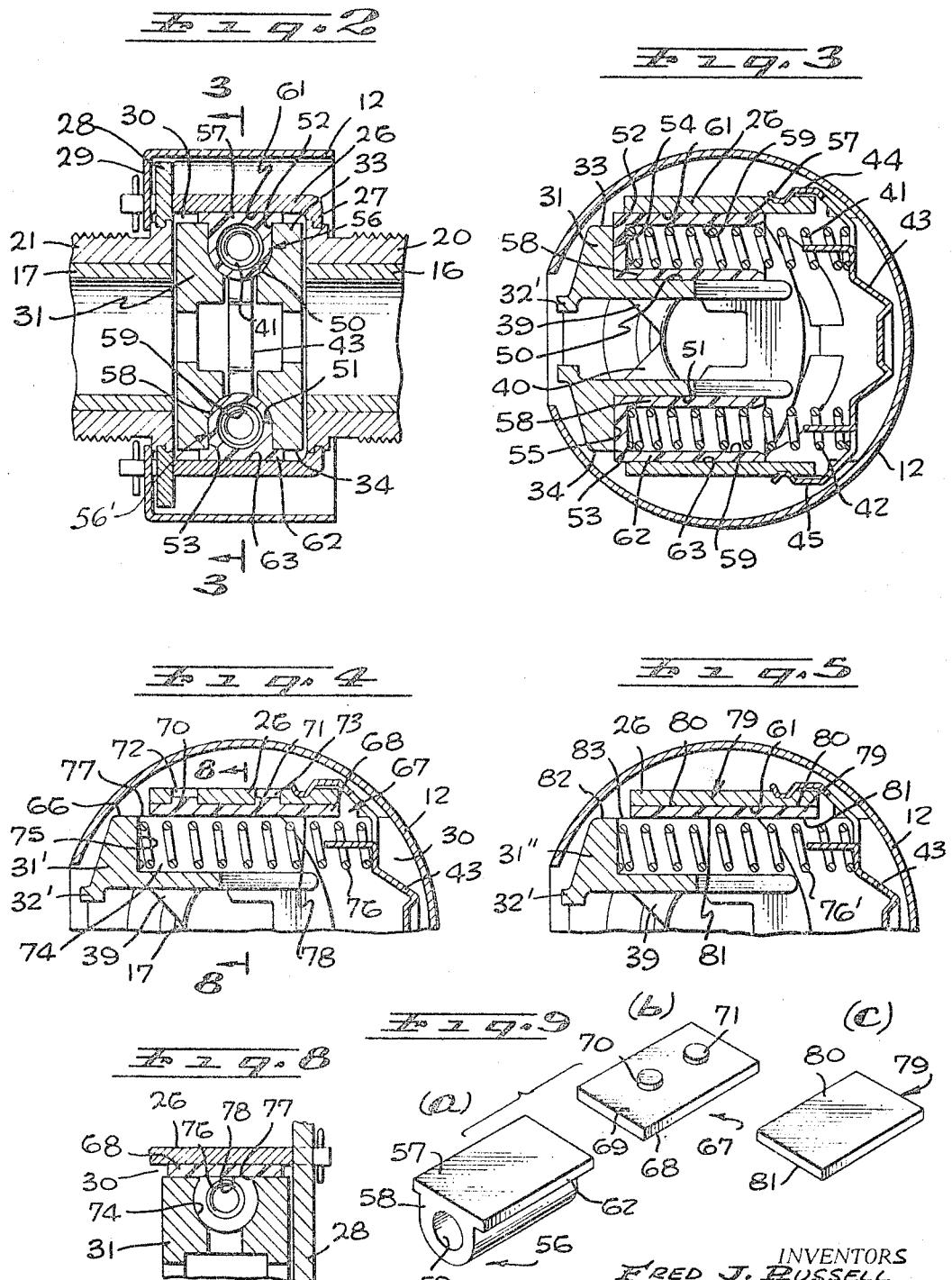

United States Patent Office 3,459,448
Patented Aug. 5, 1969

3,459,448
LOW-FRICTION INSERT FOR LATCH BOLT RETRACTOR
Fred J. Russell, South Gate, Richard L. Armstrong, Santa Fe Springs, and Vernard W. Sanders, Los Angeles, Calif., assignors, by direct and mesne assignments, to Norris Industries Inc., Los Angeles, Calif., a corporation of California
Filed Apr. 14, 1967, Ser. No. 631,062
Int. Cl. E05b 63/10
U.S. Cl. 292—336.5                                 5 Claims

ABSTRACT OF THE DISCLOSURE

The invention relates to door locks of a type provided with a reciprocating retractor which is adapted to retract a conventional latch bolt. There is a central, substantially cylindrical case which is located in an appropriate recess in the door. Within the case is an interior housing, commonly called a frame, which is fastened to the case and upon which is mounted other stationary portions of the device shown as threaded spindle bearings. Within the frame is a block-like element called a retractor which reciprocates back and forth between left-hand and right-hand positions, and which is normally urged in a direction from right to left by two springs. A plastic member of some appropriate type is mounted between opposite edges of the retractor and the interior of the frame, whereby to provide a sliding engagement. The form, location, and character of the plastic member is of significance.

---

Although there are recognized advantages to making use of a synthetic plastic resin material for parts of a door lock, merely substituting plastic material for certain of the parts in a door lock does not in itself either solve problems or necessarily provide an improved structure. Low-friction characteristics of synthetic plastic resin are advantageous when unlike materials, such as metal and plastic resin material, slide against each other. Where, however, relatively hard and sometimes sharp metallic elements must be moved against plastic resin material under pressure, they frequently knife into and gouge the plastic resin material. Also, the plastic resin material does not have needed tensile strength in small sections, which is often necessary in a lock mechanism. Some of these problems have been solved heretofore by combining plastic and metal in certain ways, as is exemplified by Russell et al. Patent No. 3,287,047, where a specially formed metal retractor has been provided with a complementary plastic shoe on opposite sides of the retractor to take advantage of low-friction characteristics, and further, wherein metal surfaces are left exposed where they must be pressed against by what is known in the trade as a rollback. On other occasions, a substantially all-plastic retractor has been supplied, reinforced at critical points with metal inserts such as those exemplified in Russell et al. Patent No. 3,287,046.

Although these prior patents and others of a comparable nature have their own special advantages, they do not in all instances have the degree of simplicity and positive action which may be desirable.

It is therefore among the objects of the invention to provide a new and improved door lock, wherein one or more special plastic inserts of simple form are used to fill the space between the retractor and the surrounding frame, whereby to provide low-friction surface characteristics where such characteristics are most advantageous and which avoid employment of plastic over areas where a metal-to-metal contact is more suitable.

Another object of the invention is to provide a new and improved door lock, wherein the retractor is provided with low-friction characteristics by the employment of one or more plastic inserts, each plastic insert being so located that it serves additionally to confine a return spring so that action of the return spring also is benefited by the presence of low-friction plastic insert material.

Still another object of the invention is to provide a new and improved lock housing, wherein plastic inserts are so formed that they can be anchored to either the retractor or to the surrounding frame in order to have them remain in position once assembled and which further are so located that the return spring means bears against a portion of the plastic material during operation, whereby to improve the ease of movement of one moving part with relation to the other and also, at the same time, to greatly increase the quietness of operation of the moving parts.

With these and other objects in view, the invention consists of the construction, arrangement, and combination of the various parts of the device, whereby the objects contemplated are attained, as hereinafter set forth, pointed out in the appended claims, and illustrated in the accompanying drawings.

In these drawings:

FIGURE 2 is a longitudinal sectional view taken on the line 2—2 in FIGURE 1;

FIGURE 3 is a cross-sectional view taken on the line 3—3 in FIGURE 2;

FIGURE 4 is a fragmentary cross-sectional view of a modified form of the device;

FIGURE 5 is a fragmentary cross-sectional view of still another form of the device;

FIGURE 8 is a fragmentary sectional view taken on the line 8—8 of FIGURE 4; and

Figure 1:
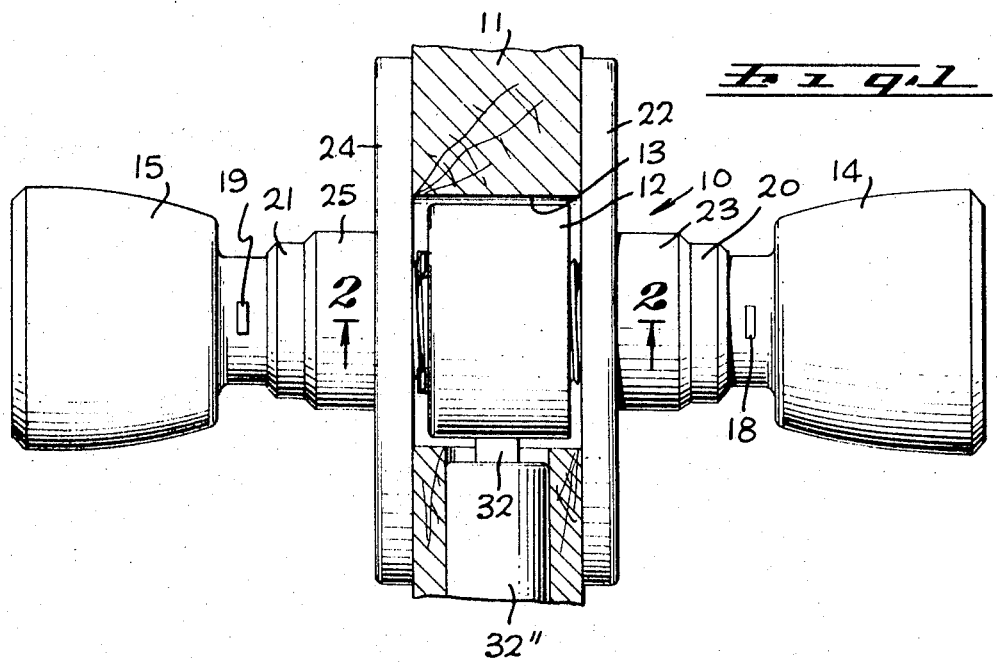
FIGURE 1 is a longitudinal view of a door lock shown mounted in position in a fragment of door.

FIGURES 9(a), (b), and (c) show side perspective views respectively of the three different forms of device illustrated in the other figures.

In an embodiment of the invention chosen for the purpose of illustration, there is shown a door lock indicated generally by the reference character 10 mounted in a fragment of door 11. The door lock 10 includes a central cylindrical case 12 located in a transverse opening 13 in the door 11. Knobs 14 and 15, nonrotatably mounted upon spindles 16 and 17 respectively by means of respective detents 18 and 19, are so constructed that the spindles 16, 17 rotate within right and left-hand spindle bearings 20 and 21 respectively. A rose 22 on one side is provided with an appropriate collar 23 which can draw the rose 22 against the door 11. A similar rose 24 on the opposite side cooperates with a collar 25 for a comparable purpose.

Located within the case 12 is a hollow metal frame 26, one wall 27 of which is attached to the spindle bearing 20. An opposite wall 28 is attached to the spindle bearing 21. By appropriate conventional means, the frame 26 is attached to the wall 28 and to a side wall 29 of the case 12. As described, the frame 26 surrounds a chamber 30 within which is located a retractor 31. Although the connection is not specifically shown, jaws 32' of the retractor 31 are adapted to be connected to a tailpiece 32 of a latch bolt assembly 32'' whereby to function in the customary way.

Figure 6:
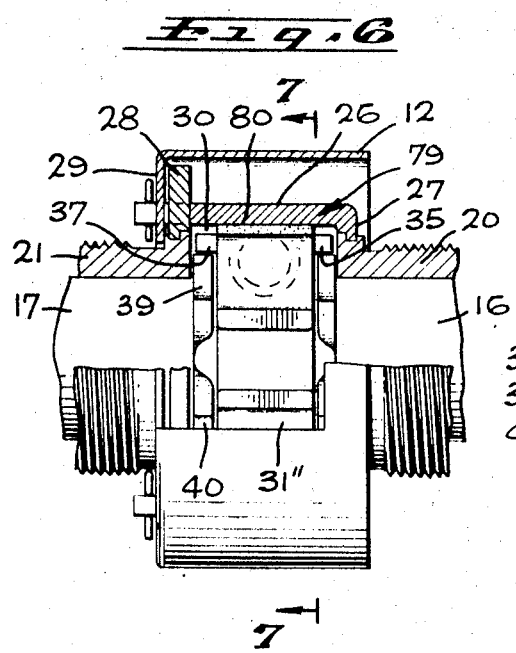
FIGURE 6 is a fragmentary longitudinal sectional view of the form of device of FIGURE 5 and taken on the line 6—6 of FIGURE 7.
Figure 7:
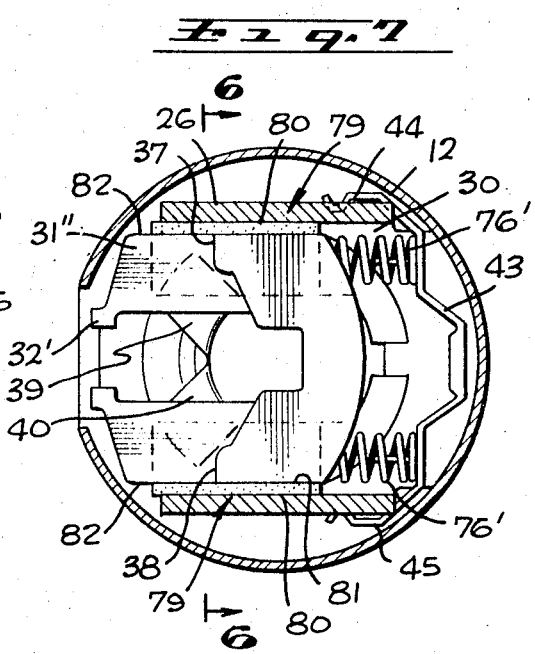
FIGURE 7 is a cross-sectional view taken on the line 7—7 of FIGURE 6.

On opposite upper and lower edges of the retractor 31 are substantially flat areas 33 and 34 which extend throughout the length and breadth of the edge. In order that the latch bolt assembly 32'' may be reciprocated by manipulation of one or another of the knobs 14 and 15, the retractor 31 on the right-hand side is provided with upper and lower rollback cam faces, one of which, namely the upper cam face 35, is shown in FIGURE 6. Similarly, on the left-hand side, as viewed in FIGURE 6 are cam faces 37 and 38. Rollbacks 39 and 40 for the spindle 17 are readily visible in FIGURES 3, 4, and 5. Similar rollbacks are provided on the spindle 16, but not shown. The rollbacks 39 and 40, when rotated by the spindle 17, are adapted to engage the cam faces 37 or 38, depending on the direction of rotation, and by engagement therewith to shift the retractor 31 in a direction from left to right, as viewed in FIGURES 3, 4, 5, and 7, against the tension of return springs 41 and 42. A spring keeper 43 overlies both of the springs 41 and 42 and has legs 44 and 45 respectively in engagement with the exterior of the frame 26.

In the form of invention of FIGURES 2, 3, 8, and 9(a), the retractor 31 is provided at its respective upper and lower sides with tubular recesses 50 and 51. The tubular recess 50 has an opening 52 coincident with the flat area 33, whereas the tubular recess 51 has a similar opening 53 coincident with the surface of the flat area 34. The tubular recess 50 has a bottom 54 and is open at the opposite end. Similarly, the tubular recess 51 has a bottom 55 and is open at the opposite end.

A low-friction spacer 56 of synthetic plastic resin material adapted to occupy the tubular recess 50 is shown in perspective in FIGURE 9(a). In this form, the low-friction spacer 56 is a block of appreciable size consisting of a spacer portion 57 and a projection 58 thereon. The projection 58 is adapted to fit snugly within the tubular recess 50, so that the spacer portion 57 is adapted to overlie the portion of the flat area 33 which surrounds the opening 52. Centrally located within the projection 58 is a spring recess 59 in which the spring 41 is located. A similar low-friction spacer 56' is located in the tubular recess 51 and is provided with a spring recess 59 for reception of the spring 42. The spacer portion 57 provides a separating low-friction shoe between the flat area 33 and the inside face 61 of the frame 26. Similarly, a spacer portion 62 acts as a low-friction shoe separating the flat area 34 from an adjacent inside face 63 of the frame 26.

In operation, when the retractor 31 is reciprocated, the retractor 31 will, by virtue of moving the two low-friction spacers 56, slide freely, snugly, and quietly within the frame 26 and at the same time, as the springs 41 and 42 contract and bear against the walls of the respective spring recesses 59, there will be a low-friction guide provided for the spring turns of the springs 41, 42 in each case, which also improves the ease of operation and the snugness and quietness of functioning.

In the form of device of FIGURE 4, a low-friction spacer 67 consists of a spacer portion 68 on one face 69 of which are transvers projections 70 and 71. For this form of device, the frame 26 is provided with transverse pockets 72 and 73 within which the transverse projections 70 and 71 respectively are adapted to fit, thereby to secure the low-friction spacer 67 in position. The low-friction spacer 67 overlies a relatively flat area 66 on the adjacent edge of the retractor 31'. On the opposite edge of the retractor 31' is a similar low-friction spacer 67. A tubular recess 74 is made use of in this form of device having a bottom wall 75 against which a spring 76 presses. In this form of device, the tubuar recess 74 is also provided with a side opening 77, whereby, when the spring 76 is contracted and the spring turns expand, the spring turns slide with a low-friction engagement against a respective face 78 of the spacer portion 68 of the low-friction spacer 67.

In the form of device of FIGURES 5, 6, 7, and 9(c) a low-friction spacer 79 is simply a rectangular flat piece of synthetic plastic resin material having an outside face 80 adapted to engage the inside face 61 of the frame 26 and having an inside face 81 adapted to overlie a flat area 82 and a side opening 83 therein. As has been heretofore described in connection with FIGURE 4, when the retractor 31'' is reciprocated, the low-friction spacer 79 serves as a separating low-friction shoe between opposite sides of the frame 26 and adjacent flat areas 82 of the retractor 31''. Here also, when the return spring 76' is compressed and the spring turns spread slightly, they ride in engagement with the adjacent inside face 81 of the low-friction spacer 79. The low-friction engagements just described appreciably improve the ease of reciprocation of the retractor 31'' and the action of the return spring 76', as well as to make the action and reciprocation quiter. Although details have not been specifically made reference to regarding the low-friction spacer 79 on the opposite side, its relationship, location, and function is the same as for the low-friction spacer 79 described in detail in the first instance.

While the invention has herein been shown and described in what is conceived to be the most practical and preferred embodiment, it is recognized that departures may be made therefrom within the scope of the invention, so as embrace any and all equivalent devices.

Having described the invention, what is claimed as new in support of Letters Patent is:

1. In a spindle-actuated door lock device comprising a frame having a chamber therein, a hub on said frame and a spindle rotatably mounted in said hub and with rollback means on said spindle located in said chamber, the combination of a retractor assembly including a metal retractor unit having a tailpiece engaging element at one end and open at the other end, a side edge of said retractor unit having a relatively flat area throughout the length and breadth of the retractor unit spaced from an adjacent inside face of said frame, said area having a centrally located spring recess with an open side throughout the entire length thereof and facing the inside face of said frame and having an open end at the end opposite said tailpiece engaging element, a spring in said recess, a spring keeper portion of said frame extending over said open end of the recess, and a low-friction spacer having a length and width comparable to the length and a substantial portion of the width of said area, said spacer being of synthetic plastic resin material extending over the open side of said spring recess and substantially filling the space between said frame and said area whereby to provide a low-friction engagement between said retractor member and the frame and between said retractor member and the spring.

2. A spindle-actuated door lock device according to claim 1, wherein said low-friction spacer includes a block of said material having a projecting portion located in said tubular spring recess and extending into said open side and a spacer portion overlying said flat area and in face-to-face engagement with the adjacent inside face of said frame, said projecting portion having a tubular opening with the interior surface of said material exposed in the tubular opening whereby to provide a low-friction engagement with substantially all sides of the spring.

3. A spindle-actuated door lock device according to claim 1, wherein said low-friction spacer includes at least one transverse projection on one face thereof, the adjacent inside face of said frame having a transverse recess with said transverse projection secured therein whereby to hold said spacer in position.

4. A spindle-actuated door lock device according to claim 1, wherein said low-friction spacer comprises a substantially rectangular sheet having opposite faces, a portion of one of said faces being in engagement with said flat area of the retractor and another portion of said one of said faces overlying the open side of said spring recess, the other face being in engagement with the adjacent inside face of said frame.

5. A spindle-actuated door lock device according to claim 1, wherein there are two low-friction spacers located one on each side of the retractor, a corresponding flat area on each side of the retractor and a corresponding inside face of the fame on each side.

References Cited

UNITED STATES PATENTS

| | | | |
|---|---|---|---|
| 2,733,088 | 1/1956 | Fisler | 292—1 |
| 2,917,337 | 12/1959 | Schlage | 292—169 X |
| 2,959,439 | 11/1960 | Russell | 292—337 X |
| 3,350,143 | 10/1967 | Lichowsky | 308—239 X |

RICHARD E. MOORE, Primary Examiner

EDWARD J. McCARTHY, Assistant Examiner